Feb. 1, 1938.  E. MAHLE  2,107,009
APPARATUS FOR MOLDING STRUT PISTONS
Filed June 26, 1935  2 Sheets-Sheet 1
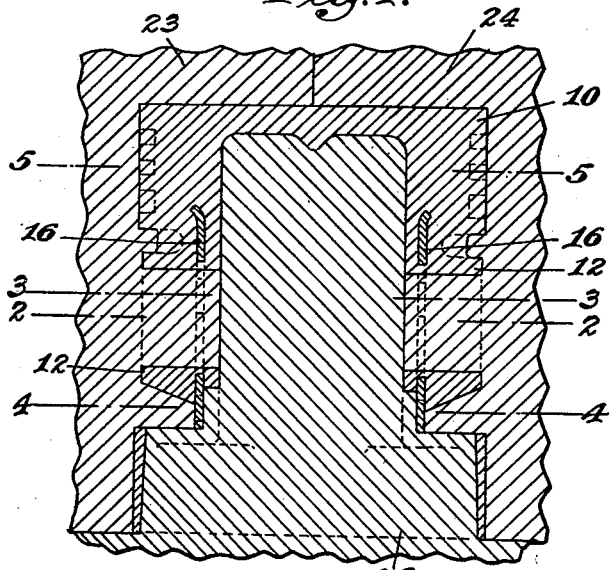
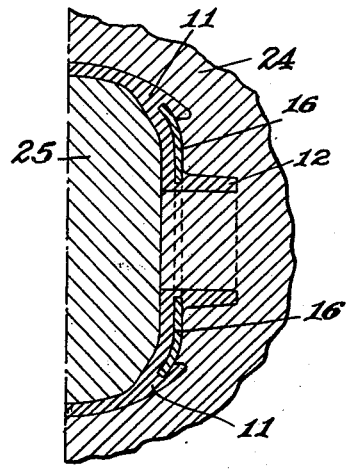
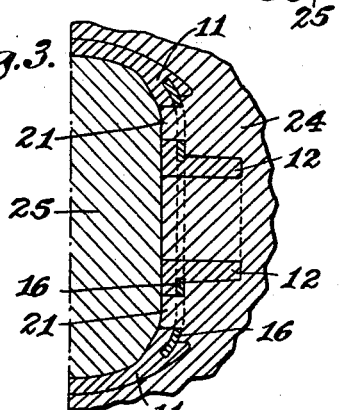
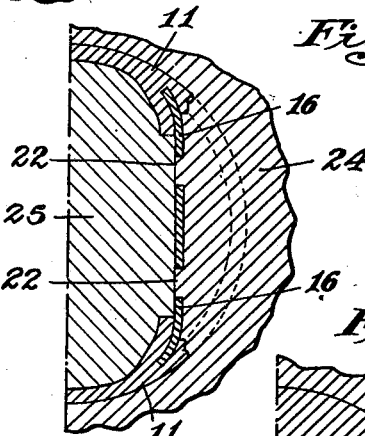
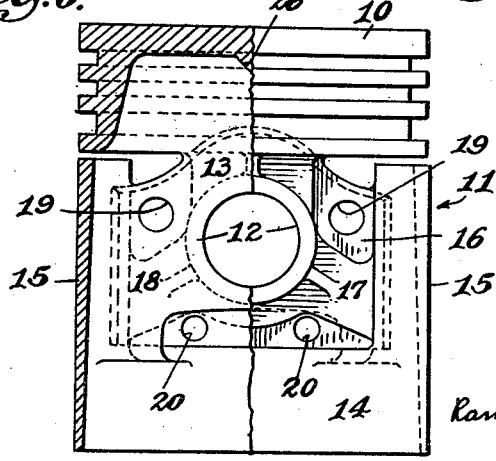
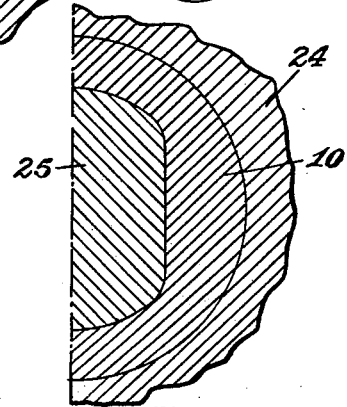
INVENTOR:
Ernst Mahle
BY Ramsey, Kent, Chisholm and Leitz
his ATTORNEY

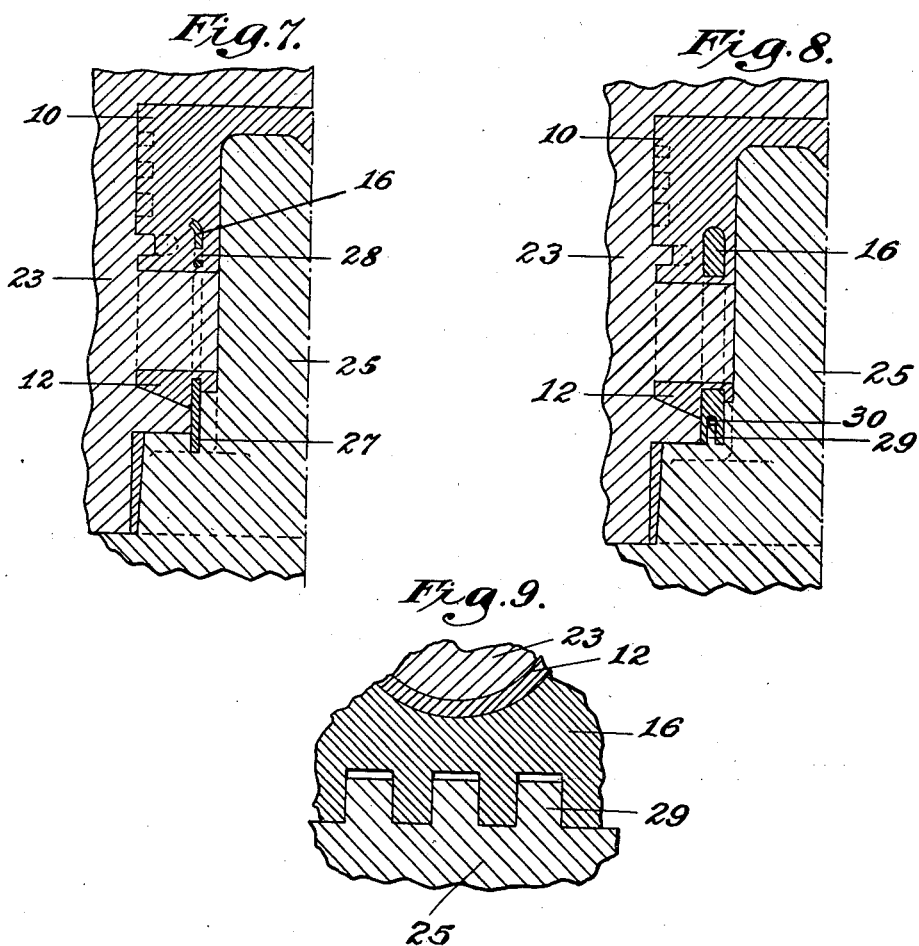

Patented Feb. 1, 1938

2,107,009

UNITED STATES PATENT OFFICE 2,107,009

APPARATUS FOR MOLDING STRUT PISTONS

Ernst Mahle, Stuttgart, Germany

Application June 26, 1935, Serial No. 28,524
In Germany June 27, 1934

6 Claims. (Cl. 22—58)

This invention relates to a piston of lightweight cast material having inserts formed of ferrous material, and to the apparatus and method used in casting the piston.

Heretofore in casting pistons having inserts formed of material differing from the piston material, for example pistons formed of aluminum alloy with steel members inserted preferably to control the expansion of the aluminum, it has been the practice to use a metal mold with a core formed of more than one piece, usually three pieces. This was done in order to provide recesses on the inner side of the head wall of the piston and to permit attaching the struts to the core prior to the casting operation. This attachment was carried out on a gas-heated device near the mold, each side core having a screw clamp which gripped a strut.

The present invention provides means whereby a piston with insert members can be cast in a mold with a one-piece core, thereby cutting production costs by expediting the molding operation, and lengthening the life of the core. The invention also permits an economical process, in which the fluid metal is fed to the mold under pressure, resulting in a much firmer structure of the piston material.

The changes in the interior of the piston structure that have been made to permit casting the piston by the improved apparatus and process also result in improving the piston structure. In particular the section that connects the pin bosses to the piston head has been solidified and strengthened.

Improvements in the mold itself include forming the center core in a single piece instead of a multiplicity of pieces, and in providing the core and/or the outer parts of the mold with formations or other means to position and carry the inserts.

These and other objects and advantages of the invention will become apparent as the description proceeds.

While preferred forms of the invention are disclosed herein for purposes of illustration, it should be understood that various changes may be made in the structure especially in reference to the positioning and carrying of the inserts without departing from the spirit of the invention as herein described and claimed.

In the drawings:

Fig. 1 is a section through a mold showing a strut piston after it has been molded.

Fig. 2 is a section on line 2—2 of Fig. 1.

Fig. 3 is a section on line 3—3 of Fig. 1.

Fig. 4 is a section on line 4—4 of Fig. 1.

Fig. 5 is a section on line 5—5 of Fig. 1.

Fig. 6 is a view partly in elevation and partly in section of the piston after removal from the mold.

Fig. 7 is a partial section through a mold showing the strut of a piston held in a groove of a one-piece core.

Fig. 8 is a partial section through a mold showing the engagement of projections formed on a one-piece core with openings in the strut.

Fig. 9 shows in a section another method of securing the strut to a one-piece core by interengaging tooth-like parts.

Referring first to the piston illustrated in Fig. 6, the head of the piston is shown at 10 and the skirt at 11. Piston pin bosses 12 are connected to the head by piers 13. The skirt includes a lower circular ring 14 and opposite partly cylindrical thrust faces 15. The parts thus far described are preferably made of some light-weight cast material, such as an alloy of aluminum.

A pair of struts 16 extend chordally across the axis of the piston pin bosses and have their ends buried in the thrust faces. These struts are usually of material different from the piston material, and may have a lower coefficient of thermal expansion than that of the piston material.

A tie 17 extends along the outer face of each strut from each pin boss to each thrust face, and a tie 18 similarly extends along the inside of each strut. The ties 17 and 18 are homogeneous with the pin bosses and with the thrust faces.

The piston of the general type just described has been in extensive commercial use for a number of years. My improvements in the piston structure reside in so forming the inside of the piston that there are no shoulders or projections extending inwardly from the piston wall that would prevent the removal of a one-piece center core.

Thus the piers 13 that extend upwardly from the pin bosses do not have any recesses that extend from the inner wall of the pier toward the outer wall of the piston head, but the inner walls of the piers extend straight upwardly from the inner ends of the piston pin bosses. In this way the piers 13 form solid columns from the piston head to the wrist pin bosses, providing extra strength to carry the heavy loads that fall on these parts.

Another alteration in the interior structure of the piston is that the inner walls of the struts 16 are completely covered at their upper parts by the inner ties 18. In previous pistons of this type the inner walls of the struts are exposed somewhere above the horizontal plane of the axis of the pin bosses, and such exposure entails the presence of projections on the core that extend outwardly above the ties 18, which in such a case are narrower than those illustrated. Such projections as well as projections to form recesses in the piers 13 can be used on a three-piece core because the two side pieces are collapsed toward the center of the piston before their removal from the mold, but they would prevent removal of a one-piece core.

An additional structural feature of the piston is the entire absence of any stiffening rib running circumferentially and projecting inwardly from the wall of the lower end of the skirt. Instead the cross-sectional thickness of the skirt is reduced going from the pin bosses toward the centers of the thrust faces so that the part of the skirt lying below the pin bosses is given a uniform resistance to bending.

The piston thus described is cast in a permanent metal mold having two outer mold halves, 23 and 24, appropriately formed to give the piston its exterior shape, and a one-piece core 25 shaped to give the interior of the piston the form described above and to permit withdrawal of the core after the piston has been molded.

In order to properly position and hold the insert members during the casting operation appropriate formations are provided on the mold, either on the outer mold halves, on the one-piece core, or on both.

An arrangement in which the struts are held by formations on the outer mold halves is illustrated in Figs. 1 to 5. In this form each strut 16 is formed for instance with a pair of upper holes 19 and a pair of lower holes 20. A pair of projections 21 are located so as to extend through the holes 19 and engage the core 25, and a pair of projections 22 extend through holes 20. Each of the mold halves 23 and 24 carries a pair of projections 21 and a pair of projections 22.

In carrying out the process with this form of mold a pair of pre-formed struts are first attached to the outer mold halves 23 and 24 by hooking them over the projections 21 and 22. These projections are formed so as to hold the struts in place during the molding operation and to accurately position them so that they will be appropriately placed in the finished piston. The outer mold parts also carry whatever projections are needed to form the openings above the struts and the recesses around the pin bosses.

The outer mold is then closed and the core 25 is inserted, after which the molten metal is poured into the mold.

An alternate method of holding the struts is to attach them to the one-piece core. One way of doing this is shown in Fig. 7, where the one-piece core 25 is provided with a pair of grooves 27. Before placing the core 25 in the mold a strut 16 is properly positioned in each groove 27, which holds the strut during the casting operation. Each strut has openings 28 into which the piston metal runs during the pouring. After the molten metal has solidified the core is withdrawn leaving the strut behind, as the latter is now embedded in the piston metal.

Fig. 8 shows a modification in which the strut is secured to the core 25 by means of core projections 29 which engage in corresponding openings of the strut.

A further modification is shown by the detail section of Fig. 9 in which the core projections 29 are tooth-like formations.

It should be understood that any suitable arrangement for holding the struts to either the core or the outer mold halves can be used, and that the struts can be held by formations on both core and outer mold halves.

A considerable advantage of the present new process lies in the fact that it permits the economical casting of pistons having inserts by the die-casting process in which the molten metal is fed to the mold under pressure. Such pressure molding produces a much firmer structure of the piston metal and gives increased strength and heat conductivity.

The molding apparatus can be operated more rapidly due to the fact that only one core need be handled, and the increased size of the one-piece core over the individual pieces of a multi-piece core results in longer mold life, as well as reducing the cost of mold manufacture.

The invention also permits the formation of a centering boss 26 on the under side of the head, which cannot be done with a multi-piece core. This centering boss makes it possible to completely finish the outer surface of the piston head before the skirt is finished.

While the improved mold and method of casting have been illustrated, as applied to a strut piston, it will be evident to one skilled in the art that they may be used to cast pistons having other pre-formed insert members, as for example members used to protect the working faces of pistons or to provide resilient parts for split skirt pistons.

I claim:

1. Apparatus for molding pistons having pre-formed metal inserts which comprises, an outer metal mold shell formed in two parts, each of which carries formations for holding an insert, and a one-piece metal mold core shaped to give the piston its internal form.

2. Apparatus for molding pistons having pre-formed metal inserts which comprises, an outer metal mold shell formed in two parts, and a one-piece extractable metal core, which carries formations homogeneous therewith for holding inserts, said core being shaped to give the piston its internal form.

3. Apparatus for molding pistons of light-weight metal having a pair of chordal control struts of ferrous metal, which comprises an outer metal mold shell formed in two parts, each of which carries a plurality of projections for engagement in openings formed in the struts to hold the struts, and a one-piece metal mold core shaped to give the piston its internal form.

4. Apparatus for molding pistons of light-weight metal having a pair of chordal control struts of ferrous metal, which comprises an outer metal mold shell formed in two parts, each of which carries formations which assist in holding a strut, and a one-piece metal mold core shaped to give the piston its internal form and carrying formations which assist in holding the struts.

5. Apparatus for molding pistons of light-weight metal having a pair of chordal control struts of ferrous metal, which comprises an outer metal mold shell formed in two parts, and a one-piece metal mold core shaped to give the piston its internal form and carrying formations for engagement in openings formed in the struts to hold the struts.

5. Apparatus for molding pistons having pre-formed metal inserts which comprises an outer metal mold shell formed in two parts, each part having a semi-cylindrical cavity, and a one-piece extractable metal core shaped to give the entire piston its internal form, at least one of said mold parts having formations for holding the inserts during the molding operation.

ERNST MAHLE.